Feb. 18, 1941.  A. F. TREMBLAY  2,232,285
TRANSFER MECHANISM FOR GLASS ARTICLES
Filed June 10, 1933  3 Sheets-Sheet 1
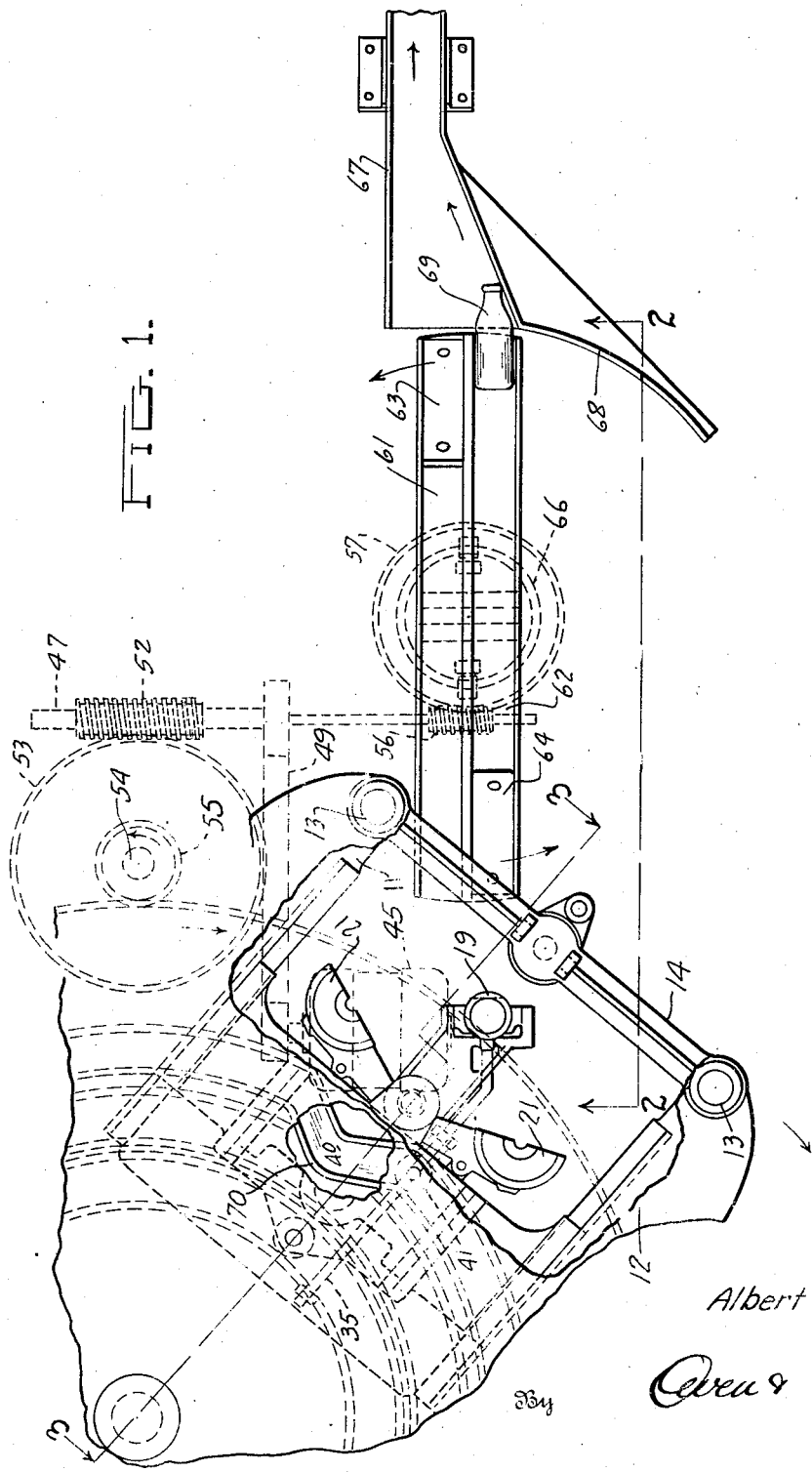
Inventor
Albert F. Tremblay

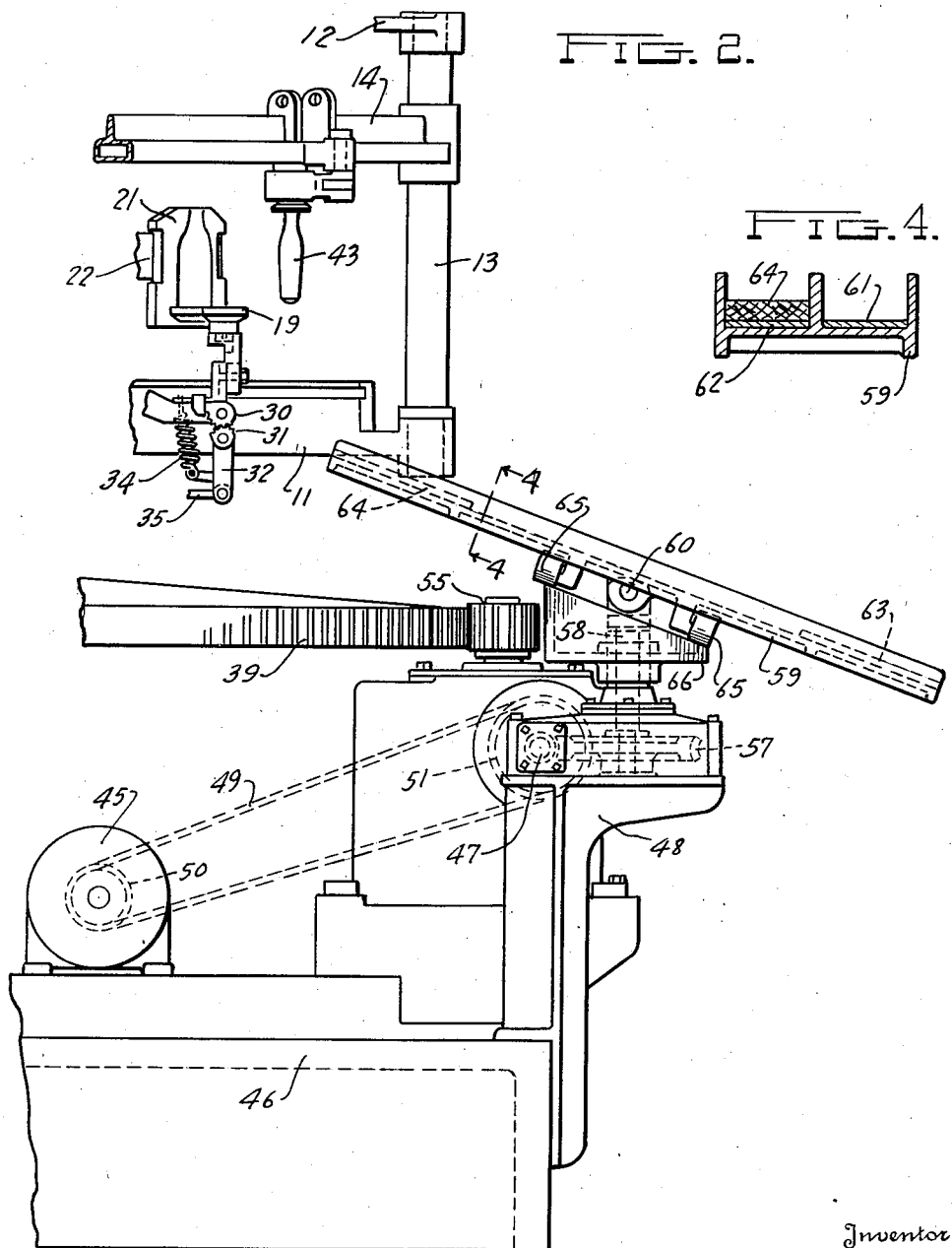

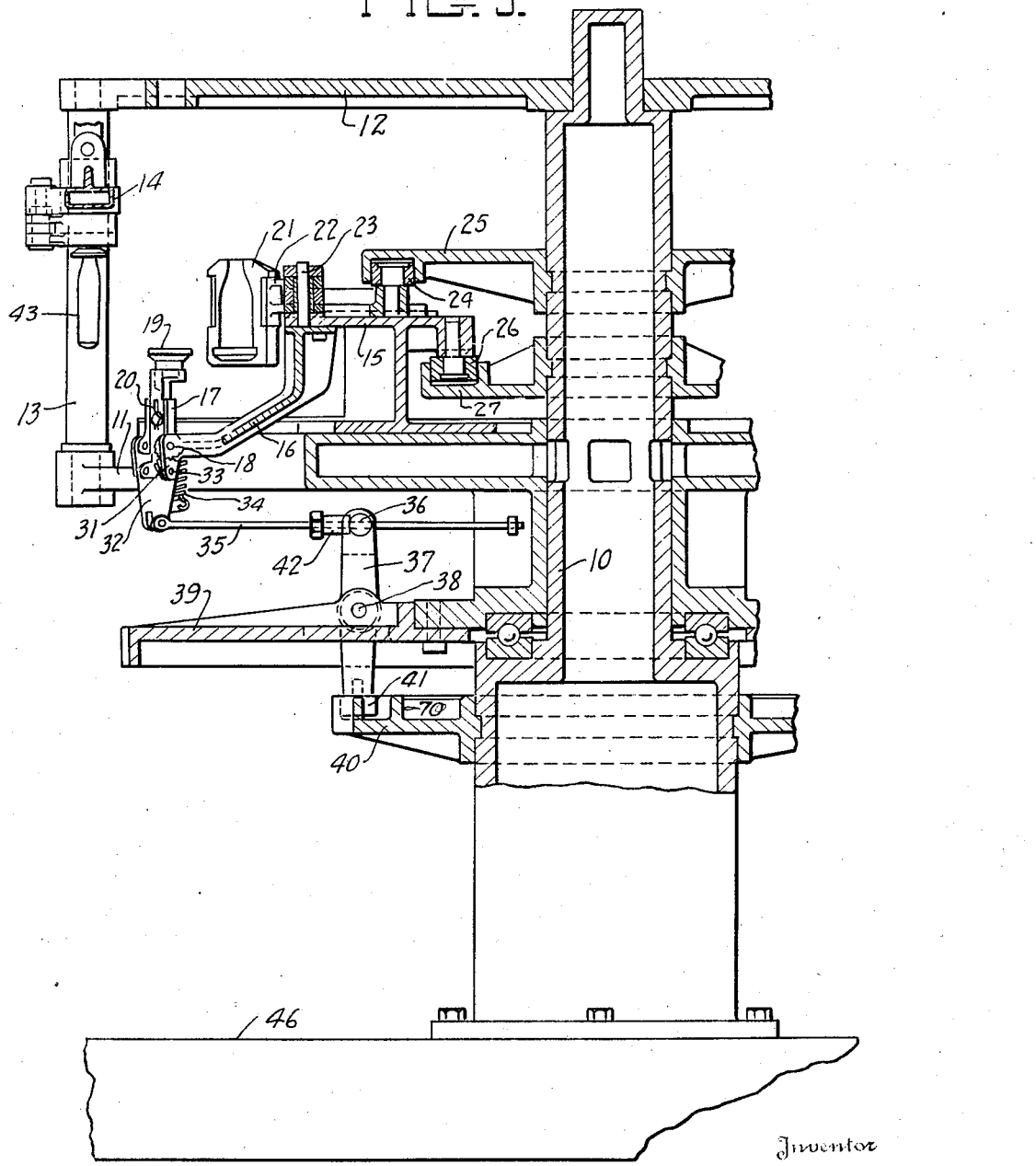

Patented Feb. 18, 1941

2,232,285

UNITED STATES PATENT OFFICE 2,232,285

TRANSFER MECHANISM FOR GLASS ARTICLES

Albert F. Tremblay, Toledo, Ohio, assignor to Kent-Owens Machine Company, Toledo, Ohio, a corporation of Ohio Application June 10, 1938, Serial No. 213,012

15 Claims. (Cl. 49—14)

This invention relates to improvements in discharging formed glass articles from the forming mechanism. More particularly, it relates to the discharging of hollow blown glass articles from a rotary blowing machine.

The object of the invention is to discharge the blown glass articles from the blow mold in such a way as not to interfere with the associated glass forming devices, and with a minimum of danger of injury to the blown articles. More specifically, the object is to properly deliver blown articles from a blowing machine wherein the completed article is discharged from a blow mold past a parison mold. A further object of the invention is to provide a receiving trough which will receive formed articles from a continuously rotating forming machine and deliver the same to a stationary chute, the receiving end of the trough moving with the forming apparatus during the receiving operation. Other objects and details of the invention will appear as the description proceeds.

In the accompanying drawings forming a part of this specification,

Fig. 1 is a plan view of apparatus showing one embodiment of the invention;

Fig. 2 is a vertical section of a portion of the apparatus approximately along line 2—2 of Fig. 1;

Fig. 3 is a vertical section of a portion of the apparatus approximately along the line 3—3 of Fig. 1;

Fig. 4 is a detailed section on the line 4—4 of Fig. 2.

In the combination shown in the drawings, the forming apparatus is mounted upon a central column 10. Rotating about this column there is a lower spider 11 and an upper spider 12 connected at the outer circle of the apparatus by means of vertical columns 13. A parison carrier 14 is mounted upon each pair of adjacent columns. There are a plurality of similar forming devices mounted in an annular series about the central column, as will be readily understood, only one of these devices being shown in the drawings, the other devices being exactly similar in construction, as will be readily understood.

Mounted upon the lower spider 11 there is a mold carrier slide 15. Downward and outward from the mold carrier slide there projects a bracket 16 on the outer end of which there is mounted a mold bottom support 17 pivoted on the bracket at 18. A mold bottom 19 is mounted upon the bottom support 18 by means of an adjustable connection 20. In this way the bottom may be readily adjusted vertically to accommodate molds of different lengths for molding bottles or the like of different sizes.

Mold sides 21 are mounted in the usual way upon arms 22 which are pivoted at 23 upon the mold slide. The slide is provided with a roller 24 connected in the usual manner to the mold operating arms to open and close the mold. The roller is actuated at proper times by a cam 25 mounted upon the central column. The mold carrier slide also carries a cam roller 26 which is operated by a cam 27 on the central column to move the slide inward and outward as desired.

Mold bottom support 17 is provided with segmental gears 30 which mesh with segmental gears 31 on a lever 32 which is fulcrumed at 33 upon mold bottom bracket 16. A spring 34 is attached to lever 32 and to bracket 16 so as to normally hold the bottom in the upright position in which it is shown in the drawings.

A rod 35 is pivoted to the bottom of lever 32 and slides through an opening in a lug 36 which is pivoted in the top of a lever 37. Lever 37 is fulcrumed at 38 in a gear wheel 39 connected with the bottom spider. A cam 40 is mounted upon the central column beneath gear wheel 39 and engages a cam roller 41 on the lower end of lever 37. An abutment 42 is mounted upon rod 35 and is engaged by lug 36 when the upper end of lever 37 is moved outward.

Pivot 18 is arranged at an angle so as to discharge a formed bottle between a parison 43, suspended from parison carrier 14, and the adjacent connecting column 13. Also, it preferably discharges the bottle in a direction that slants backward with respect to the movement of the mold in its revolution about the central column. Above bottom 19 there is arranged a blow head, not shown, which may be actuated by any suitable means not shown for cooperation with the blow mold when the sides are closed about the bottom.

A motor 45 is mounted on one side of the base 46 which supports column 10. A shaft 47 is mounted in a bracket 48, also mounted upon base 46. Shaft 47 is driven by a sprocket chain 49, which engages a sprocket wheel 50 on the motor shaft and a sprocket wheel 51 on shaft 47. One end of shaft 47 is provided with a worm 52 which engages a worm wheel 53 on an upright shaft 54 which carries at its upper end a gear 55 meshing with gear wheel 39. During the normal operation of the apparatus, motor 45 runs constantly and rotates gear 39 and its attached turret continuously.

On the other end of shaft 47 there is a worm 56 driving a worm wheel 57 on the lower end of upright shaft 58. A trough carrier 59 is pivoted at 60 on the upper end of shaft 58. The trough carrier is provided with two parallel troughs or channels 61 and 62. At one end of trough 61 there is a receiving cushion block 63, and at the other end of trough 62 there is a similar receiving cushion block 64. Rollers 65, mounted on the under side of carrier 59, engage a stationary track 66 and compel the trough to rotate in an inclined plane.

Mounted at one side of the path of the troughs, as shown in Fig. 1, there is a chute 67 adapted to discharge the blown article to any suitable receiving means. Extending from one side of the receiving end of chute 67 there is an abutment plate 68. It will be readily observed that if a bottle 69 reaches the discharge end of the trough prior to the registering of the discharge end of the trough with the receiving end of the chute, the end of the bottle will ride against plate 68 until it reaches the chute, whereupon it will be discharged into the chute. As will appear from Fig. 1, the portion 70 of cam 40 is so located that the mold bottom is tilted to discharge the bottle into the upper end of the trough while the lower end of the trough is directed against abutment plate 68. Preferably the action is timed so that the bottle will slide down the trough and reach the discharge end at about the time the discharge end registers with the chute; but the use of abutment plate 68 provides for some leeway in the adjustment so that the timing does not need to be as accurate as it would otherwise have to be, and also accidental variations from the usual speed of movement of the discharged article will be taken care of automatically.

The operation of the device will be evident from the foregoing description, but for convenience may be summarized as follows:

It will be readily understood that any suitable parison-forming apparatus is mounted upon the turret at a point lower than the blow mold. Suitable means may be provided for raising and lowering parison carrier 14 upon the columns 13 so as to raise the formed parison 43 from its forming position to a position on a level with the blow mold. At the proper time, cams 25 and 27 move the blow mold slide outward and close the blow mold about the suspended parison 43. Later, the blow mold slide is moved inward and the article may be either blown or sustained in blown shape by blow head 44. For purposes of speeding up the operation of the mechanism it is preferable to retain the bottle on bottom 19 until the succeeding parison has been formed and raised to the position in which it is shown in the drawings. Thereupon cam portion 70 of cam 40 operates lever 37 to move its upper end outwardly so that lug 36 contacts abutment 42 on rod 35 and forces outward the lower end of lever 32 against the tension of spring 34. By means of the segmental gear connections, this tilts the mold bottom outwardly about inclined pivot 18 and discharges the bottle outward between blank 43 and the following column 13. The movement of trough carrier 59 is synchronized with the movement of the turret so that the receiving end of the trough enters between column 13 and parison 43 in position to receive the bottle when it is discharged. As will be seen, the cushioning block is in the receiving end of the trough channel nearest to the parison, and the bottle is tilted onto the cushioning block, which may be made of wood or the like. The bottle then slides down the trough and is discharged into chute 67, as previously described. The trough is rotated so that the other end of the trough member brings the receiving end of the other trough channel into position to receive the bottle from the next succeeding blow mold.

The support 66 may be shaped in any desired way so that the trough carrier may be rotated in the same way in which it would move about a fixed inclined axis, or the surface of member 66 may be, and preferably is, flattened at the highest and lowest points, so as to give a temporary dwell at substantially the same inclination while receiving and discharging the article.

It will be readily seen that the rotating receiving trough substantially as described might be employed with widely differing glass-forming apparatus, since it could be synchronized with any suitable rotating forming device, but it is particularly adapted for use with apparatus where it is necessary or desirable to receive the discharged article at a point inside of the exterior circle of the glass forming apparatus. It will be seen also that the feature of discharging the blown article at an angle so as to avoid the parison located directly outward therefrom might be utilized with varying receiving devices. It will also be understood that other apparatus might be employed for inserting the receiving end of a discharge trough between members on the outer circle of a glass-forming machine in order to receive the finished article at a point within said outer circle. Therefore, while the various features of the apparatus as shown and described cooperate with each other to accomplish a very desirable and efficient means of delivering the blown article, it will be readily understood that various modifications may be made, and that some of the features may be used separately without sacrificing all of the advantages of the invention, and therefore departures may be made, from the construction shown and described, within the scope of the appended claims.

What I claim is:

1. In combination, a rotary support and an annular series of glass forming devices upon said support, each device comprising means for discharging a finished article at a point nearer the axis of the support than portions of the forming device, a receiving trough, and means for moving the receiving end of the trough in synchronism with the support to move the trough between said outer portions of successive devices to receive articles as they are discharged, and then move said receiving end with the article outside of said outer portions.

2. Apparatus in accordance with claim 1, and comprising means to rotate said trough about a substantially vertical axis, and in meshing relation with the forming devices.

3. Apparatus in accordance with claim 1, and comprising means to rotate said trough in meshing relation with the forming devices, and a stationary chute in position to receive articles from the end of the trough substantially opposite its receiving point.

4. An annular series of glass-forming devices, means to rotate the series and discharge articles from successive devices as they pass a given point, a rotary receiving trough, a stationary receiving chute, and means for rotating the trough, synchronized with the rotation of said series to move alternate ends of the trough into position to receive successive articles as they are discharged from the forming machine, and to deliver the articles to the receiving chute.

5. Apparatus in accordance with claim 4, and said trough comprising two channels, the receiving end of one channel being at one end of the trough and the receiving end of the other channel being at the other end of the trough.

6. In combination, a rotary support, a series of parison-suspending means in an outer circle on said support, a series of blow molds, each movable horizontally from an inner position to an outer position in registry with a suspended parison, means to discharge a blown article outwardly from the mold while the mold is in its inner position, a trough member mounted to rotate in an inclined plane adjacent the said rotary support, and means to rotate said support and said trough in meshing relation whereby the ends of the trough are presented in succession past suspended parisons to receive blown articles from the blow molds.

7. Apparatus in accordance with claim 6, and the trough comprising parallel channels, a cushion block at one end of the trough in one channel, and a cushion block at the other end of the trough in the other channel.

8. A receiving trough adapted to receive successive articles from a glass-forming machine and deliver them to a stationary chute, said trough being mounted to rotate in an inclined plane with the upper side of the plane on the receiving side and the lower side of the plane on the discharge side, said trough being provided with two channels with a cushion block at the receiving end of each channel.

9. In combination, an annular series of glass molds, means to rotate the series and discharge articles from each mold in succession as it passes a given point, a stationary chute spaced from said point, an open ended trough mounted to rotate in an inclined plane between said point and chute with the higher side of the plane adjacent said point, and means synchronizing the rotation of the trough with the movement of the molds to present the upper end of the trough to said point at the time an article is discharge and to present the other end of the trough to said chute at approximately the time the article has slid to said other end.

10. Apparatus in accordance with claim 9 and comprising an abutment plate extending from the end of the chute along the path of the end of the trough as it approaches the chute.

11. An annular series of glass molds, means to rotate the series and discharge articles from each mold in succession as it passes a given point, a rotary trough member, and means to rotate said member in synchronism with said series of molds to position an end of the trough in receiving position for each successive article as it is discharged, the trough member having two channels, one channel at one end of the trough being presented to receive one article and the other channel at the other end of the trough being presented to receive the next succeeding article.

12. An annular series of glass molds, means to rotate the series and discharge articles from each mold in succession as it passes a given point, a rotary trough member, and means to rotate said member in synchronism with said series of molds to position an end of the trough in receiving position for each successive article as it is discharged, the trough member having two parallel channels lengthwise thereof, a receiving block at one end of one channel and a receiving block at the opposite end of the other channel, and the rotating means being synchronized to present the receiving blocks alternately to receive successive articles.

13. An annular series of glass molds, means to rotate the series and discharge articles from each mold in succession as it passes a given point, a rotary trough member, and means to rotate said member in synchronism with said series of molds to position an end of the trough in receiving position for each successive article as it is discharged, the means to rotate the trough member comprising a vertical shaft, a horizontal pivot on the shaft, the trough member being mounted midway of its length on said pivot, and a cam track about said shaft and governing the angle of the trough to the shaft.

14. An annular series of glass molds, means to rotate the series and discharge articles from each mold in succession as it passes a given point, a rotary trough member, and means to rotate said member in synchronism with said series of molds to position an end of the trough in receiving position for each successive article as it is discharged, the apparatus comprising a stationary chute adjacent the path of the trough member at a point in that path substantially opposite the point where the trough end is in receiving position.

15. An annular series of glass molds, means to rotate the series and discharge articles from each mold in succession as it passes a given point, a rotary trough member, and means to rotate said member in synchronism with said series of molds to position an end of the trough in receiving position for each successive article as it is discharged, the apparatus comprising a stationary chute adjacent the path of the trough member at a point in that path substantially opposite the point where the trough end is in receiving position, and an abutment plate extending from the receiving end of the chute along the path of the trough member as it approaches the chute.

ALBERT F. TREMBLAY.